United States Patent
Nakai

(10) Patent No.: US 9,771,036 B2
(45) Date of Patent: Sep. 26, 2017

(54) ELECTRICALLY CONDUCTIVE PATH CONNECTING MEMBER

(71) Applicant: Yazaki Corporation, Tokyo (JP)

(72) Inventor: Satoshi Nakai, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/931,160

(22) Filed: Nov. 3, 2015

(65) Prior Publication Data

US 2016/0125979 A1    May 5, 2016

(30) Foreign Application Priority Data

Nov. 4, 2014 (JP) ................................ 2014-224704

(51) Int. Cl.
*H02G 11/00* (2006.01)
*B60R 16/02* (2006.01)
*B60L 3/00* (2006.01)
*H02G 3/04* (2006.01)

(52) U.S. Cl.
CPC ........ *B60R 16/0215* (2013.01); *B60L 3/0069* (2013.01); *H02G 3/0406* (2013.01); *H02G 3/0481* (2013.01); *H02G 11/00* (2013.01)

(58) Field of Classification Search
USPC .................. 172/72 A; 174/50.6; 439/607.41
See application file for complete search history.

(56) References Cited

U.S. PATENT DOCUMENTS

| | | | | |
|---|---|---|---|---|
| 3,944,316 A | * | 3/1976 | Newman | ............ H01R 13/6453 200/51.09 |
| 4,985,598 A | * | 1/1991 | Bubica | ..................... H02G 1/14 156/49 |
| 6,780,068 B2 | * | 8/2004 | Bartholoma | ......... H01R 13/648 439/752 |
| 7,255,613 B2 | * | 8/2007 | Mackey | ............... H01R 13/405 439/736 |
| 2002/0056566 A1 | * | 5/2002 | Laake | .................... H02G 15/10 174/88 R |
| 2004/0084202 A1 | * | 5/2004 | Angele | .................... H02G 1/14 174/93 |
| 2010/0096184 A1 | * | 4/2010 | Ambo | ................. B60R 16/0215 174/72 A |
| 2013/0140055 A1 | | 6/2013 | Adachi et al. | |
| 2013/0299235 A1 | | 11/2013 | Adachi et al. | |

FOREIGN PATENT DOCUMENTS

| | | | |
|---|---|---|---|
| CN | 101573839 A | 11/2009 | |
| CN | 103081029 A | 5/2013 | |
| DE | EP 0535712 A2 * | 4/1993 | ......... B60R 16/0207 |
| JP | 2012-152047 A | 8/2012 | |

OTHER PUBLICATIONS

Communication dated Mar. 1, 2017 issued by the State Intellectual Property Office of the People's Republic of China in counterpart Chinese Patent Application No. 201510738120.6.

* cited by examiner

*Primary Examiner* — William H Mayo, III
*Assistant Examiner* — Krystal Robinson
(74) *Attorney, Agent, or Firm* — Sughrue Mion, PLLC

(57) ABSTRACT

An electrically conductive path connecting member includes a plurality of conductors and one pair of insulating holding members. The plurality of conductors respectively have bent parts in a longitudinal direction. The one pair of insulating holding members hold both end parts of the conductors.

14 Claims, 6 Drawing Sheets

ELECTRICALLY CONDUCTIVE PATH CONNECTING MEMBER

CROSS REFERENCE TO RELATED APPLICATIONS

This application claims priority from Japanese Patent Application No. 2014-224704 filed on Nov. 4, 2014, the entire contents of which are incorporated herein by reference.

TECHNICAL FIELD

The present invention relates to an electrically conductive path connecting member.

BACKGROUND ART

Many electric devices are mounted on vehicles such as an electric motor vehicle or a hybrid car. These electric devices are electrically connected together. For instance, a battery is connected to an inverter and the inverter is connected to a load such as a motor. The electric devices are connected together through a wire harness having a plurality of high voltage electric wires.

When such kind of vehicle receives a strong impact at the time of its collision, the electric wires which connect the electric devices together may be sometimes possibly pulled and cut. The electric wires cut in such a way have a risk that an insulating coating is broken so that a conductor is exposed.

Patent literature 1 discloses a structure of an electrically conductive path in which an excessive length part formed by folding double an electrically conductive path is provided in an intermediate part of the electrically conductive path which electrically connects two electric devices to each other and the folded form of the excessive length part is drawn out when the electrically conductive path is pulled toward both end sides to prevent the electrically conductive path from being cut.

PRIOR ART LITERATURE

Patent Literature

[Patent Document 1] JP-A-2012-152047

SUMMARY OF THE INVENTION

Problems that the Invention is to Solve

However, in the electrically conductive path disclosed in the patent literature 1, a problem arises that since the excessive length part is formed with the electrically conductive path folded double to lengthen the electrically conductive path and enlarge a space for wiring, a degree of freedom for wiring is limited.

The present invention is devised by considering the above-described problems, and it is an object of the present invention to provide a structure of an electrically conductive path in which a degree of freedom for wiring of an electrically conductive path is high and the electrically conductive path can be prevented from being broken when the electrically conductive path is pulled toward opposite directions to each other.

Means for Solving the Problems

In order to solve the above-described problems, an electrically conductive path connecting member of the present invention includes a plurality of conductors having bent parts in a longitudinal direction and one pair of insulating holding members which respectively hold both end parts of the conductors.

According to the electrically conductive path connecting member of the present invention, since electric wires are respectively connected to both ends of the conductors, an electrically conductive path can be formed. When both the ends of the conductors are respectively pulled toward directions in which both the ends of the conductors are separated from each other, since the bent parts of the conductors are respectively stretched at the same time to form an excessive length part, the electrically conductive path can be prevented from being broken. Further, since the electrically conductive path can be set to be short, a degree of freedom for wiring can be improved.

In this case, the one pair of insulating holding members may be supported by support members extending in the longitudinal directions of the conductors so as to freely slide.

According to the above-described structure, the one pair of insulating members can be smoothly moved in the longitudinal directions of the conductors, the conductors can be respectively uniformly stretched.

Further, the support members may be configured in cylindrical forms. The one pair of insulating holding members may be respectively accommodated in the support members. On inner peripheral surfaces of the support members, rotation regulating parts may be provided which regulate the rotations of the one pair of insulating holding members.

According to the above-described structure, since a dimension of an entire length of the support member is set to a prescribed size, even when an impact is received during a collision of a vehicle, the conductors can be protected to keep insulating in the state that they are respectively accommodated in the support members. Thus, the conductors can be prevented from being exposed and a safety at the time of the collision of the vehicle can be improved. Further, the conductors can be prevented from a contact with each other due to a distortion caused by the rotations of the insulating holding members, so that the electrically conductive path connecting member can be made to be compact.

Further, annular packing members can be attached to the one pair of insulating holding members, wherein the annular packing members respectively seal gaps between the inner peripheral surfaces of the support members and the insulating holding members.

According to the above-described structure, since liquid can be prevented from entering to the support members from the gaps between outer peripheral surfaces of the insulating holding members and the inner peripheral surfaces of the support members, a short-circuit among the conductors or an electric shock due to the liquid can be prevented.

Further, the plurality of conductors may be formed integrally with the one pair of insulating holding members in the state that both the end parts of the conductors respectively connected to the electric wires are surrounded by elastic members having elasticity.

According to the above-described structure, when the electric wires connected to both the end parts of the conductors are pulled from oblique directions relative to the longitudinal directions thereof, external forces of pulling directions can be absorbed by the elastic members, so that the electric wires can be prevented from being cut. Further, since both the end parts of the conductors are integrally formed with the insulating holding members in the state that both the end parts of the conductors are surrounded by the elastic members and covered with the insulating holding members, a fixing force of the electric wires and the insulating holding members can be improved.

Advantage of the Invention

According to the present invention, the degree of freedom for wiring of the electrically conductive path can be improved and the electrically conductive path can be prevented from being broken when the electrically conductive path is pulled toward opposite directions to each other.

MODE FOR CARRYING OUT THE INVENTION

Figure 1:
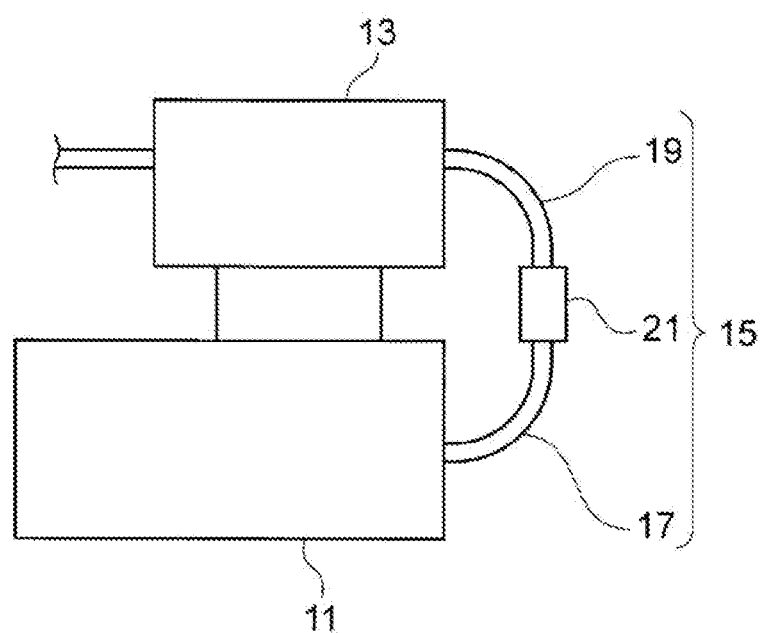
FIG. 1 is a structure diagram of an entire part of an electrically conductive path having an electrically conductive path connecting member to which the present invention is applied.

Now, one exemplary embodiment of an electrically conductive path connecting member to which the present invention is applied will be described below by referring to the drawings.

In the present exemplary embodiment, an example is described in which the electrically conductive path connecting member of the present invention is provided in an intermediate part of an electrically conductive path (high voltage electric wires) which connects together electric devices mounted on a vehicle such as an electric motor vehicle or a hybrid car. However, the electrically conductive path connecting member of the present invention may be provided not only in the intermediate part of this kind of electrically conductive path, but also in intermediate parts of all kinds of electrically conductive paths which connect together the electric devices.

FIG. 1 is a diagram showing a connecting state of the electric devices mounted on the electric motor vehicle or the hybrid car. In this example, one electric device is supposed to be a motor 11 and the other electric device is supposed to be an inverter 13. On the motor 11, the inverter 13 is arranged. The motor 11 is electrically connected to the inverter 13 through an electrically conductive path 15. An electric power supplied from, for instance, a power source not shown in the drawing is supplied to the motor 11 through the inverter 13 and the electrically conductive path 15. The electrically conductive path 15 includes an electric wire bundle 17 having a plurality of electric wires wherein one end side of the electric wire bundle 17 is connected to the motor 11, an electric wire bundle 19 having a plurality of electric wires wherein one end side of the electric wire bundle 19 is connected to the inverter 13 and an electrically conductive path connecting member 21 which electrically connects together the other end sides of the electric wire bundles 17 and 19.

In the electric wire bundles 17 and 19 respectively, connectors are connected to one end parts of the electric wires respectively forming the electric wire bundles 17 and 19, and respectively connected to terminals arranged in casings of the motor 11 and the inverter 13. In the present exemplary embodiment, an example is described in which the electric wire bundles 17 and 19 respectively have three electric wires. However, the number of the electric wires is not limited to three and a desired number of electric wires may be bundled to form the electric wire bundle. The electric wire bundles 17 and 19 have flexibility and can be easily deformed. The electric wire bundles 17 and 19 can be bent and laid in desired positions as shown in FIG. 1. The electrically conductive path connecting member 21, which is not shown in the drawing, is fixed to a prescribed position in the vehicle.

Figure 2:
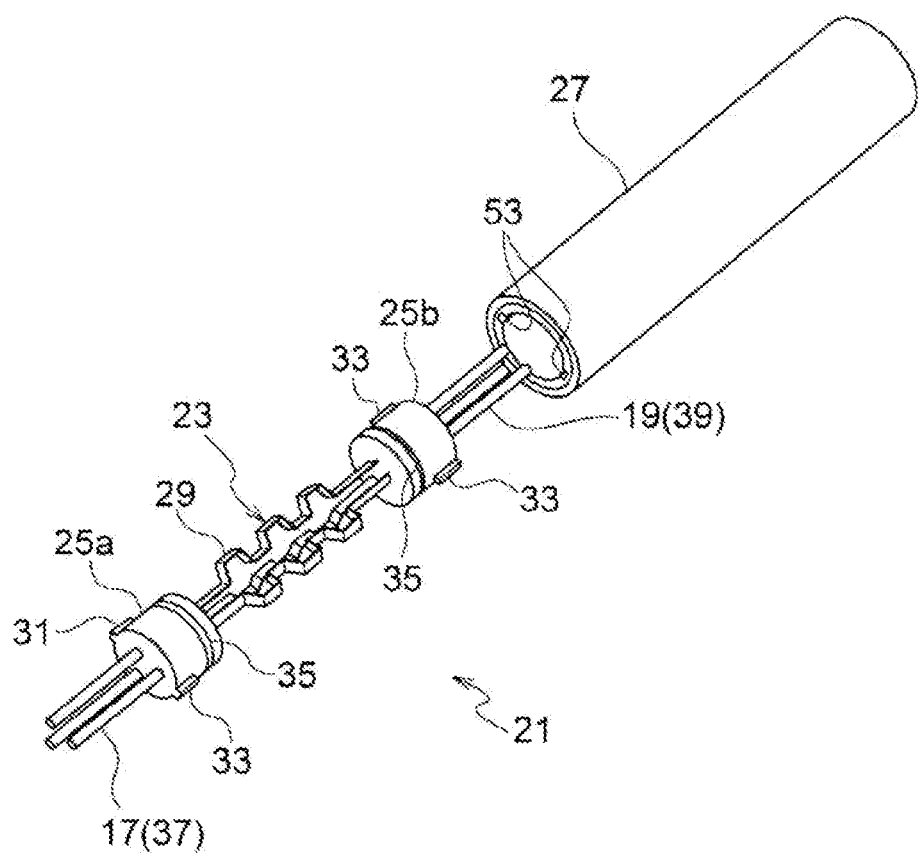
FIG. 2 is a perspective view showing an inner structure of the electrically conductive path connecting member to which the present invention is applied.
Figure 3:
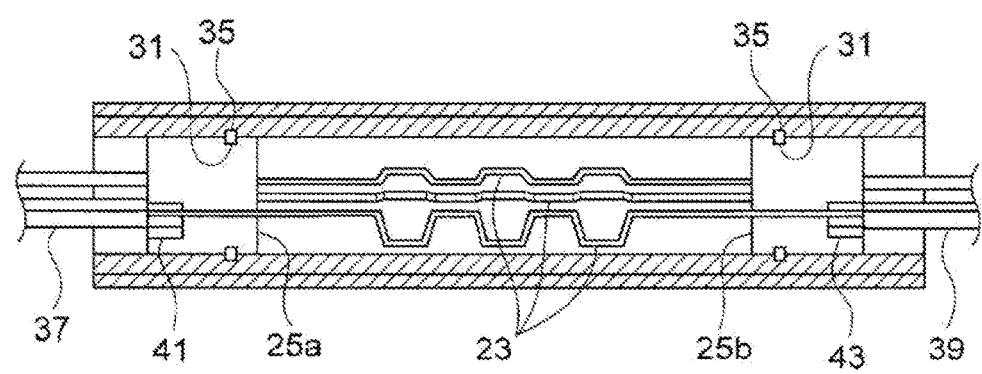
FIG. 3 is a longitudinally sectional view showing the inner structure of the electrically conductive path connecting member to which the present invention is applied.

As shown in FIGS. 2 and 3, the electrically conductive path connecting member 21 of the present exemplary embodiment includes three conductors 23 having an electric conductivity, one pair of insulating holding members 25a and 25b which respectively hold both end parts of the conductors 23 and support members 27 which extend in the longitudinal directions of the conductors 23 to support the one pair of insulating holding members 25a and 25b so as to freely slide.

The conductors 23 are respectively configured in the same forms by applying a prescribed press work to a metallic belt shaped sheet material which is configured in a rectangular form in section. In a plurality of parts (three in the present exemplary embodiment) in the longitudinal directions of the conductors 23, bent parts 29 are respectively formed. The bent parts 29 are respectively configured in trapezoidal forms in section by bending the conductors 23 in directions of thickness thereof and arranged substantially at equal intervals in the longitudinal directions. The bent parts 29 are respectively formed so as to protrude in the same directions from reference planes of both end parts of the conductors 23, namely from opposed end faces in the direction of thickness.

In the conductors 23 respectively, a thickness of the conductors is set in such a way that when an impact is applied thereto at the time of a collision of the vehicle and both the ends in the longitudinal directions are pulled to opposite directions to each other, namely, in the directions that the conductors 23 are stretched, the bent parts 29 can be respectively stretched in the longitudinal directions of the conductors 23. When the bent parts 29 are stretched, an excessive length part is formed in the longitudinal directions of the conductors 23. Further, since the bent parts 29 are formed in the trapezoidal forms, not only the bent parts 29 are stretched in the longitudinal directions, but also the bent parts 29 are elastically deformed in such directions as to decrease angles of both side surfaces (inclined surfaces) which rise from the reference planes of the conductors 23 when the conductors 23 are contracted in the longitudinal directions. Thus, the bent parts 29 are contracted in the longitudinal directions to absorb an external force.

As long as the conductors 23 can be stretched in the longitudinal directions when the conductors 23 are pulled in the longitudinal directions, the sectional forms of the bent parts 29 are not limited to the trapezoidal forms, and may be configured in, for instance, circular arc forms, triangular forms or a rectangular forms, or a corrugated forms continuous in the longitudinal directions. Further, the number of the bent parts 29 is not limited to three and may be singular.

On the other hand, the one pair of insulating holding members 25a and 25b which cover both the end parts of the conductors 23 with an insulating resin, and are respectively configured in cylindrical forms and respectively coaxially held through the conductors 23. The conductors 23 are respectively arranged substantially at equal intervals on a common central axis of the insulating holding members 25a and 25b. The bent parts 29 of the conductors 23 are respectively arranged so as to protrude in radial directions. Annular grooves 31 and one pairs of rotation regulating protrusions 33 which extend in an axial direction are provided on outer peripheral surfaces of the insulating holding members 25a and 25b. Annular packing 35 is attached to the annular grooves 31. The rotation regulating protrusions 33 can be engaged with rotation regulating grooves 53 on inner peripheral surfaces of the below-described support members 27.

Figure 4:
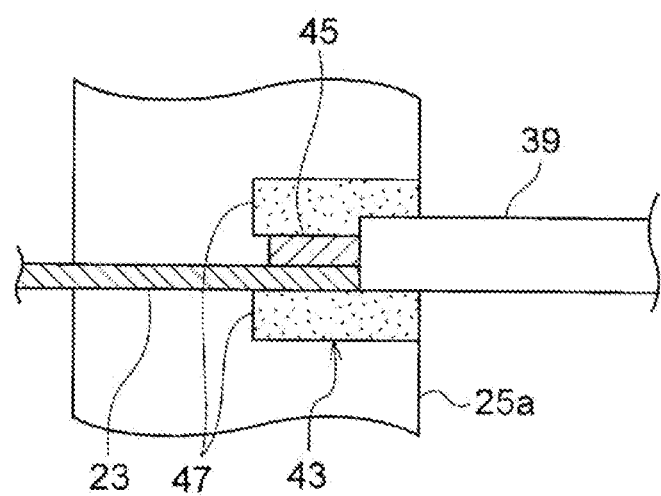
FIG. 4 is a sectional view showing a structure with an electric wire connected to a conductor shown in FIG. 3 in an enlarged form.

One end parts of the conductors 23 are respectively connected to the electric wires 37 through a connecting part 41 and the other end parts of the conductors 23 are respectively connected to the electric wires 39 through a connecting part 43. The connecting part 41 and the connecting part 43 have the same structure. As shown in FIG. 4, the connecting part 43 is formed in such a way that a fixed part is enclosed by an elastic member 47 having an elasticity formed with rubber or elastomer or the like. Further, the connecting part 43 is covered with a resin so as to be formed integrally with the insulating holding member 25b. Both end parts of a core wire 45 exposed from one end part of the electric wire 39 and the conductor 23 are fixed to the fixed part. The fixed part of the conductor 23 and the core wire 45 is formed by caulking or ultrasonic welding. The insulating holding members 25a and 25b of the present exemplary embodiment are respectively formed by an insert molding of the connecting parts 41 and 43.

Figure 5:
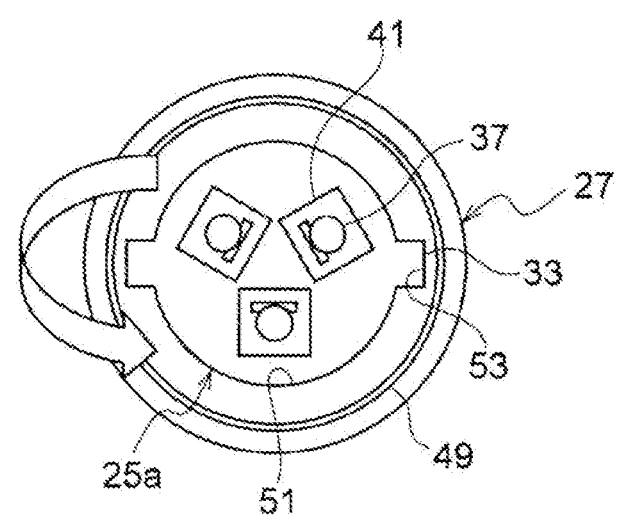
FIG. 5 is a side view showing the electrically conductive path connecting member to which the present invention is applied from its axial direction.

The one pair of insulating holding members 25a and 25b are inserted into the cylindrical support members 27 from one direction in the state that the insulating holding members 25a and 25b are respectively held through the conductors 23. As shown in FIG. 5, the support members 27 are formed in such a way that inner and outer peripheral surfaces of metallic tube bodies 49 which are configured in cylindrical forms are respectively covered with an insulating resin. The support members 27 are formed to respectively accommodate the insulating holding members 25a and 25b so as to freely slide in the axial direction. Since the support members 27 have the tube bodies 49, such a strength is ensured that the support members 27 are not deformed even when the impact is applied thereto at the time of the collision of the vehicle. On the inner peripheral surfaces 51 of the support members 27, the slit shaped rotation regulating grooves 53 are provided to extend in the axial directions, wherein the rotation regulating protrusions 33 protruding from the outer peripheral surfaces of the insulating holding members 25a and 25b are engaged with the slit shaped rotation regulating grooves 53.

The one pair of insulating holding members 25a and 25b are respectively accommodated and supported in the support members 27 in the state that the rotation regulating protrusions 33 are engaged with the rotation regulating grooves 53 of the support members 27. A movement of the one pair of the insulating holding members 25a and 25b in a rotating direction (an arrow mark) is regulated in the support members 27. Further, since the packing 35 attached to the annular grooves 31 presses the inner peripheral surfaces 51 of the support members 27, the one pair of insulating holding members 25a and 25b are held by the support members 27 and gaps to the inner peripheral surfaces 51 of the support members are sealed.

In the electrically conductive path connecting member 21 of the present exemplary embodiment, when the electric wires 37 and 39 are respectively connected to both the end parts of the conductors 23, the electrically conductive path 15 can be formed. Since the electrically conductive path 15 formed in such a way can form the excessive length part without, for instance, folding double the electrically conductive path 15, an attaching property is high, a length of the electrically conductive path 15 can be set to be small and a degree of freedom for wiring can be improved during an attachment of the electrically conductive path 15.

Figure 6:
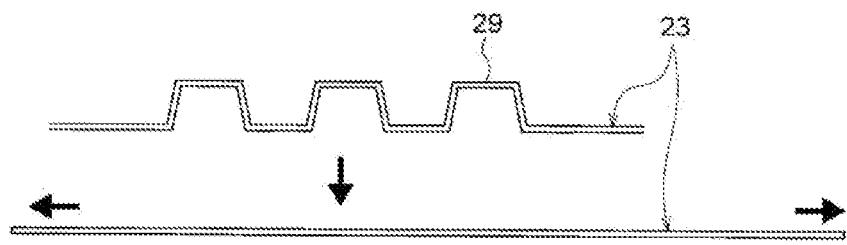
FIG. 6 is an explanatory view of an operation when the conductor is pulled.

Further, in the electrically conductive path connecting member 21 of the present exemplary embodiment, since the conductors 23 respectively have the bent parts 29 which can be stretched and the insulating holding members 25a and 25b which respectively hold both the ends of the conductors 23 are supported by the support members 27 so as to freely slide, when the electric wires 37 and 39 move in directions that the electric wires 37 and 39 are separated from each other due to the impact during the collision of the vehicle, the one pair of insulating holding members 25a and 25b uniformly stretch the conductors 23 respectively and move along the inner peripheral surfaces of the support members 27 in the directions that the insulating holding members 25a and 25b are separated from each other. Namely, as shown in FIG. 6, the conductors 23 follow the movement of the one pair of insulating holding members 25a and 25b and are plastically deformed until the bent parts 29 respectively have linear configurations. Accordingly, in the electrically conductive path connecting member 21, as long as the conductors 23 are respectively stretched within a range that the conductors 23 are not completely stretched to be linear, the electrically conductive path connecting member 21 can prevent the electrically conductive path 15 from being broken.

In the conductors 23, a thickness needs to be set in such a way that the conductors 23 are stretched by a force that does not break other parts of the electrically conductive path 15. A length in which the conductors 23 can be stretched needs to be set to a length, which is longer than the length determined by laws and regulations, for instance, the length is a distance that the electric wires 37 and 39 are separated from each other due to the impact during the collision of the vehicle.

Further, in the present exemplary embodiment, the connecting parts 41 and 43 are formed with the elastic members 47 having flexibility higher than that of the insulating holding members 25a and 25b. Thus, when the electric wires 37 and 39 are pulled from, for instance, directions inclined relative to the axial directions of the insulating holding members 25a and 25b, an external force in the pulling directions is absorbed by the elastic members 47. As a result, a load of the connecting parts 41 and 43 is reduced so that the electric wires 37 and 39 may be prevented from being broken. Further, the connecting parts 41 and 43 are formed integrally with the insulating holding members 25a and 25b, even when the connecting parts 41 and 43 are pulled by the electric wires 37 and 39, the connecting parts 41 and 43 are not slipped out of the insulating holding members 25a and 25b.

Further, in the present exemplary embodiment, the length of the support members 27 is set so that the insulating holding members 25a and 25b are not slipped off from the support members 27 even if the conductors 23 are stretched to their limits as shown in FIG. 6. Accordingly, even when the insulating holding members 25a and 25b receive the impact during the collision of the vehicle, the insulating holding members 25a and 25b can insulate and protect the conductors 23 in the state that the conductors 23 are accommodated in the support members 27. Thus, a danger due to an exposure of the conductors 23 can be prevented and a safety of the electrically conductive path 15 can be improved.

Further, since the gaps between the outer peripheral surfaces of the insulating holding members 25a and 25b and the inner peripheral surfaces 51 of the support members 27 are sealed by the packing 35, the insulating holding members 25a and 25b press the inner peripheral surfaces 51 of the support members 27 by the packing 35 and slide. Accordingly, a holding force of the insulating holding members 25a and 25b can be improved by the support members 27, liquid can be prevented from entering the support members 27 and an electric shock or a short-circuit among the conductors 23 can be prevented.

Further, in the insulating holding members 25a and 25b, since the rotation regulating protrusions 33 on the outer peripheral surfaces are engaged with the rotation regulating grooves 53 of the support members 27, a distortion due to a rotation does not arise in the insulating holding members 25a and 25b in the state that the insulating holding members 25a and 25b are accommodated in the support members 27. Accordingly, since the conductors 23 are constantly held at prescribed intervals, short-circuit due to a contact of the conductors 23 can be prevented. Thus, spaces between the conductors 23 can be set to be short, the electrically conductive path connecting member 21 can be made to be compact. Further, since the support members 27 are formed to include the metallic tube bodies 49 and have such strength that the support members 27 are not deformed even when the support members 27 receive the impact during the collision of the vehicle, the insulating holding members 25a and 25b can be constantly smoothly moved. Further, the conductors 23 can be prevented from a contact with each other due to the deformation of the support members 27. Thus, according to the present exemplary embodiment, an electric reliability of the electrically conductive path connecting member 21 is ensured and a miniaturization thereof can be easily realized.

Further, since the conductors 23 of the present exemplary embodiment have the bent parts 29 which are provided to protrude in the radial directions relative to the central axis of the insulating holding members 25a and 25b, even when the bent parts 29 are allowed to protrude much from the reference planes of the conductors 23, the conductors 23 do not contact with other conductors 23. Accordingly, since the excessive length part by the stretch of the bent parts 29 can be freely set, a degree of freedom for design of the electrically conductive path 15 can be improved.

Further, according to the present exemplary embodiment, since the conductors 23 are extended and contracted in the longitudinal directions so that a vibration may be absorbed, even when a shaking of the vehicle is transmitted and a distance between the insulating holding member 25a and 25b is shortened, the conductors 23 are extended and contracted so that the vibration may be absorbed. Thus, since a deterioration of the connecting members 41 and 43 can be suppressed, a life of the electrically conductive path connecting member 21 can be improved.

The exemplary embodiment of the present invention is specifically described above by referring to the drawings. However, the above-described exemplary embodiment merely exemplifies the present invention and may be changed or modified within a range described in claims.

For instance, in the present exemplary embodiment, is described a structure that the insulating holding members 25a and 25b configured in the cylindrical forms are accommodated in the support members 27 so as to freely slide. However, the support members 27 are not limited to have the cylindrical forms. For instance, the support members may be configured in the form of one rail and the insulating holding members which respectively support both ends of the conductors 23 may be formed so as to slide along the support members. In this structure, the conductors 23 are not insulated nor protected by the support members. However, when an electrically conductive path connecting member formed as described above is accommodated in an insulating vessel, a countermeasure for preventing an electric shock can be devised. Further, when spaces among the conductors 23 are set to be large, since a contact among the conductors 23 can be prevented without supporting the insulating holding members, the support members may be omitted.

Further, in the present exemplary embodiment, is described an example that the connecting parts 41 and 43 are formed integrally with the insulating holding members 25a and 25b. However, the connecting parts 41 and 43 may be formed separately from the insulating holding members 25a and 25b. In this case, in the insulating holding members 25a and 25b, it is necessary to provide, for instance, recessed parts which accommodate and hold the connecting parts 41 and 43 and through holes into which the electric wires 37 and 39 are inserted.

DESCRIPTION OF REFERENCE NUMERALS AND SIGNS 15 electrically conductive path
21 electrically conductive path connecting member
23 conductor
25a, 25b insulating holding member
27 support member
29 bent part
33 rotation regulating protrusion
35 packing
37, 39 electric wire
41, 43 connecting part
47 elastic member
53 rotation regulating groove

What is claimed is:

1. An electrically conductive path connecting member for connecting end sides of electric wires comprising:
   a plurality of conductors having bent parts in a longitudinal direction; and
   one pair of insulating holding members which respectively hold opposite end parts of the conductors, the holding members being independent and isolated from each other,
   wherein the one pair of insulating holding members are supported by a support member extending in the longitudinal direction of the conductors so as to freely slide.

2. The electrically conductive path connecting member according to claim 1,
   wherein one or more bend parts are respectively formed on the conductors so that the conductors are capable of stretching in the longitudinal direction.

3. The electrically conductive path connecting member according to claim 2, wherein the plurality of conductors are formed integrally with the one pair of insulating holding members in a state that both the end parts of the conductors respectively connected to electric wires are surrounded by elastic members having elasticity.

4. The electrically conductive path connecting member according to claim 2, wherein when the bend parts are contracted by an external force in the longitudinal direction, the bend parts are elastically deformed in the longitudinal direction to absorb the external force.

5. The electrically conductive path connecting member according to claim 4, wherein the bent parts are respectively arranged so as to protrude in radial directions.

6. The electrically conductive path connecting member according claim 5,
wherein the plurality of conductors are formed integrally with the one pair of insulating holding members in a state that both the end parts of the conductors respectively connected to electric wires are surrounded by elastic members having elasticity.

7. The electrically conductive path connecting member according claim 4,
wherein the plurality of conductors are formed integrally with the one pair of insulating holding members in a state that both the end parts of the conductors respectively connected to electric wires are surrounded by elastic members having elasticity.

8. The electrically conductive path connecting member according to claim 1, wherein the one pair of insulating holding members are respectively accommodated in the support member, and
wherein a rotation regulating part which regulates rotations of the one pair of insulating holding members is provided on an inner peripheral surface of the support member.

9. The electrically conductive path connecting member according to claim 8,
wherein annular packing members which are respectively seal gaps between the inner peripheral surface of the support member and the insulating holding members are attached to the one pair of insulating holding members.

10. The electrically conductive path connecting member according claim 9,
wherein the plurality of conductors are formed integrally with the one pair of insulating holding members in a state that both the end parts of the conductors respectively connected to electric wires are surrounded by elastic members having elasticity.

11. The electrically conductive path connecting member according claim 8,
wherein the plurality of conductors are formed integrally with the one pair of insulating holding members in a state that both the end parts of the conductors respectively connected to electric wires are surrounded by elastic members having elasticity.

12. The electrically conductive path connecting member according to claim 1,
wherein the plurality of conductors are formed integrally with the one pair of insulating holding members in a state that both the end parts of the conductors respectively connected to electric wires are surrounded by elastic members having elasticity.

13. The electrically conductive path connecting member according to claim 1,
wherein the plurality of conductors are formed integrally with the one pair of insulating holding members in a state that both the end parts of the conductors respectively connected to electric wires are surrounded by elastic members having elasticity.

14. An electrically conductive path connecting member for connecting end sides of electric wires comprising:
a first end part and a second end part in a longitudinal direction;
a plurality of conductors having bent parts in between the first end and the second end in the longitudinal direction;
a first insulating holding member and a second insulating holding member respectively holding the plurality of conductors, the first insulating member provided at the first end part of the connecting member and the second insulating member provided at the second part of the connecting member,
wherein an end side of a first electric wire of the electric wires is configured to be connected to the first end part and an end side of a second electric wire of the electric wires is configured to be connected to the second end part, and
wherein the one pair of insulating holding members are supported by a support member extending in the longitudinal direction of the conductors so as to freely slide.

* * * * *